United States Patent [19]

Montroy

[11] 3,993,377
[45] Nov. 23, 1976

[54] PREFABRICATED CABINET ASSEMBLY

[76] Inventor: John F. Montroy, 13124 St. Andrews Drive, Oklahoma City, Okla. 73114

[22] Filed: Sept. 22, 1975

[21] Appl. No.: 615,696

[52] U.S. Cl. .............................. 312/263; 312/257 R; 312/198
[51] Int. Cl.² ........................................ A47B 47/00
[58] Field of Search .......... 312/195, 257 R, 257 SK, 312/263, 198; 5/299, 300

[56] References Cited
UNITED STATES PATENTS

| 603,162 | 4/1898 | Baker | 312/263 |
|---|---|---|---|
| 2,548,425 | 12/1970 | Goldstein | 312/263 |
| 3,835,795 | 9/1974 | Levenberg | 312/263 |
| 3,848,942 | 11/1974 | Fanini | 312/263 |

Primary Examiner—Casmir A. Nunberg
Attorney, Agent, or Firm—Laney, Dougherty, Hessin & Fish

[57] ABSTRACT

An improved prefabricated cabinet assembly characterized by first and second precut opposite end bulkheads and one or more precut intermediate bulkheads lying in spaced, mutually parallel planes and rigidly connectable to a plurality of precut front panels lying in a common plane normal to the planes of the bulkheads. Each intermediate bulkhead is provided with clip assembly means for mutual interconnection with a corresponding one of the front panels proximate one vertical edge thereof and adjacent the vertical edge of the next adjacent front panel. Each intermediate bulkhead further includes clip assembly means for rigidly connecting the intermediate bulkhead to the front panel next adjacent the front panel corresponding thereto. Also disclosed are upper and lower precut back supports which mutually interconnect the end bulkheads and intermediate bulkheads to complete the rigid cabinet assembly.

13 Claims, 12 Drawing Figures

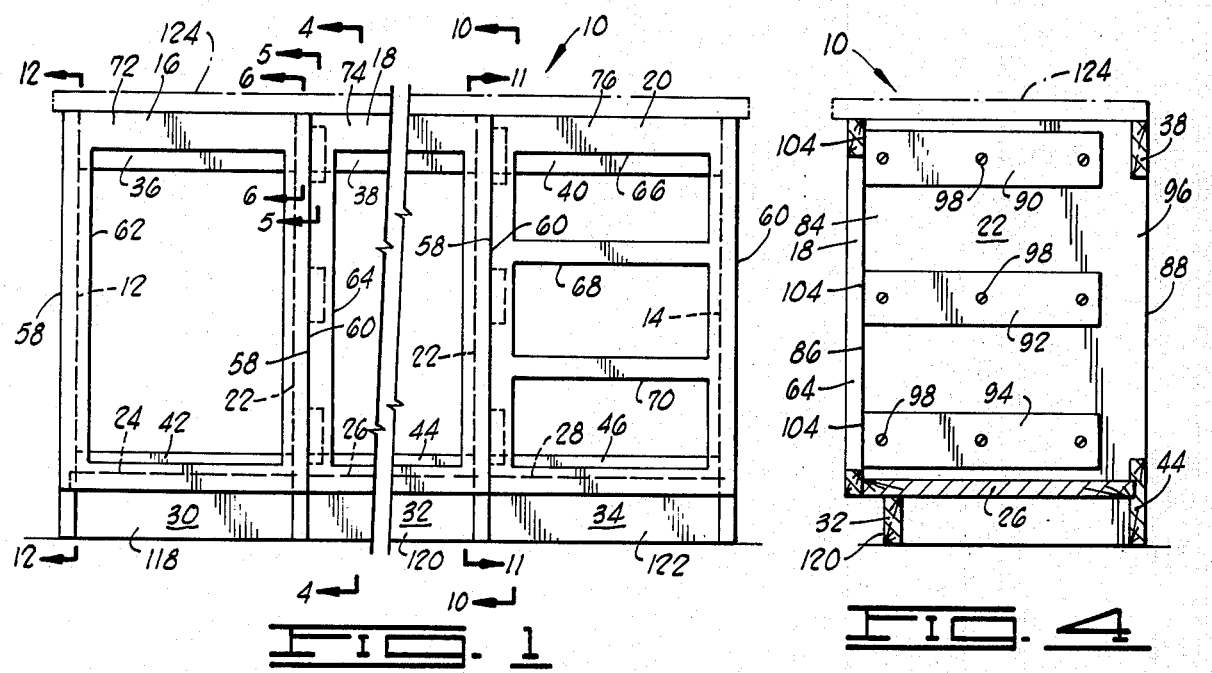
FIG. 1
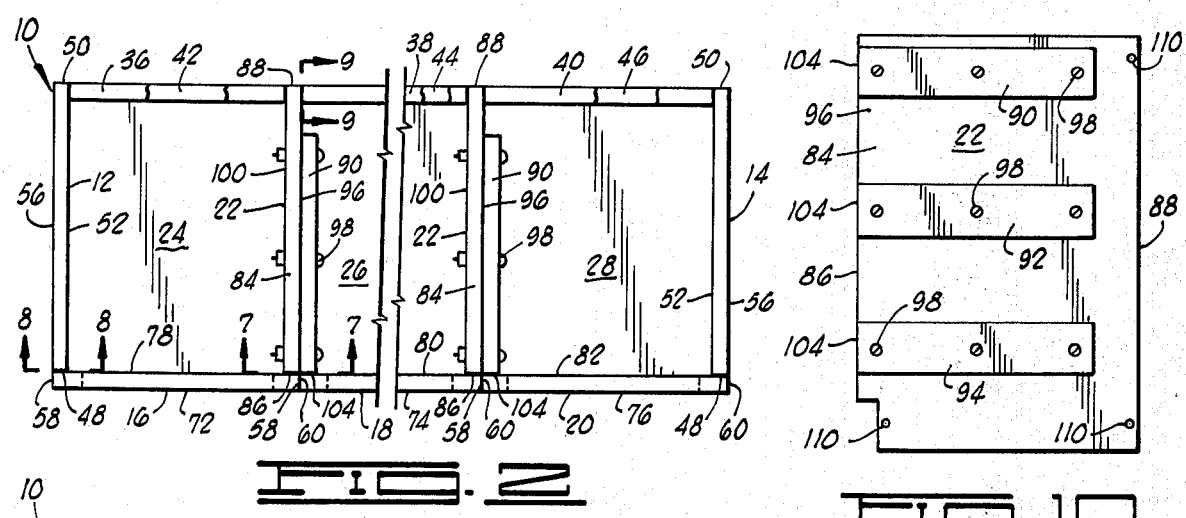
FIG. 2
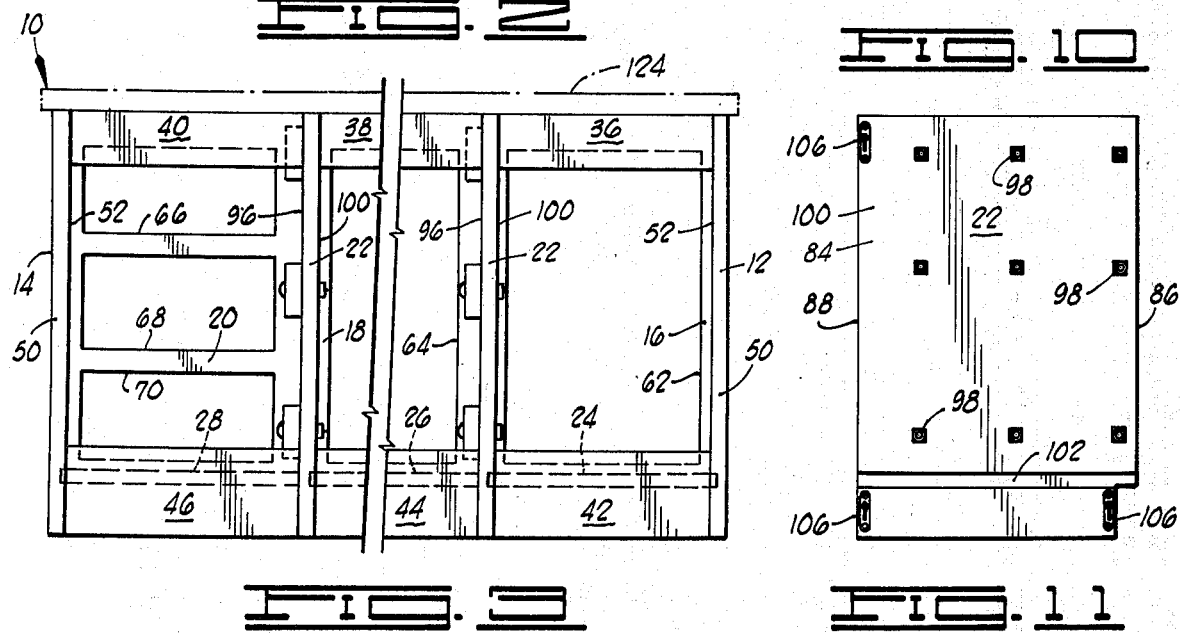
FIG. 3
FIG. 4
FIG. 10
FIG. 11

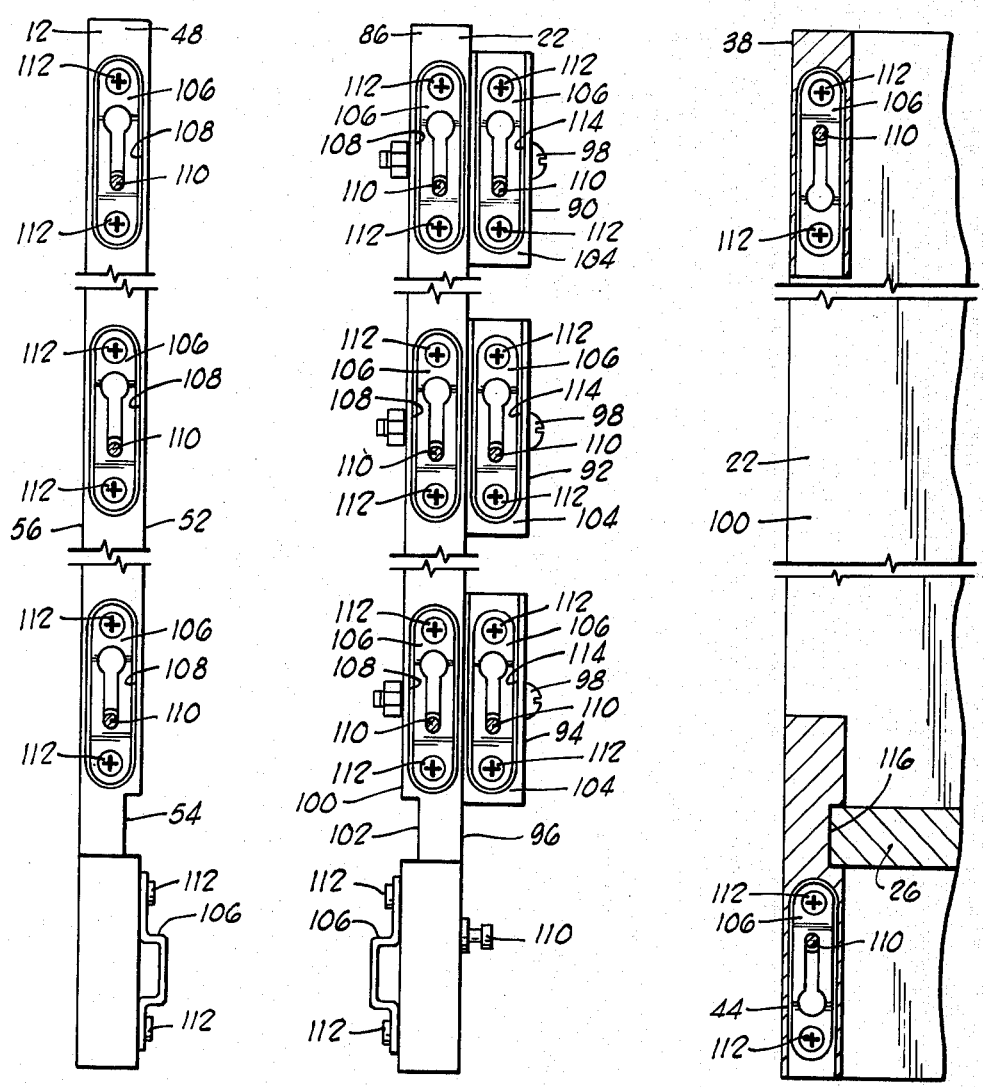
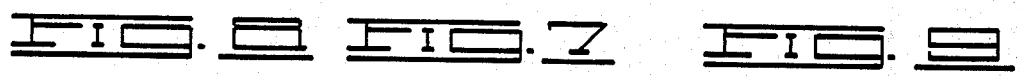
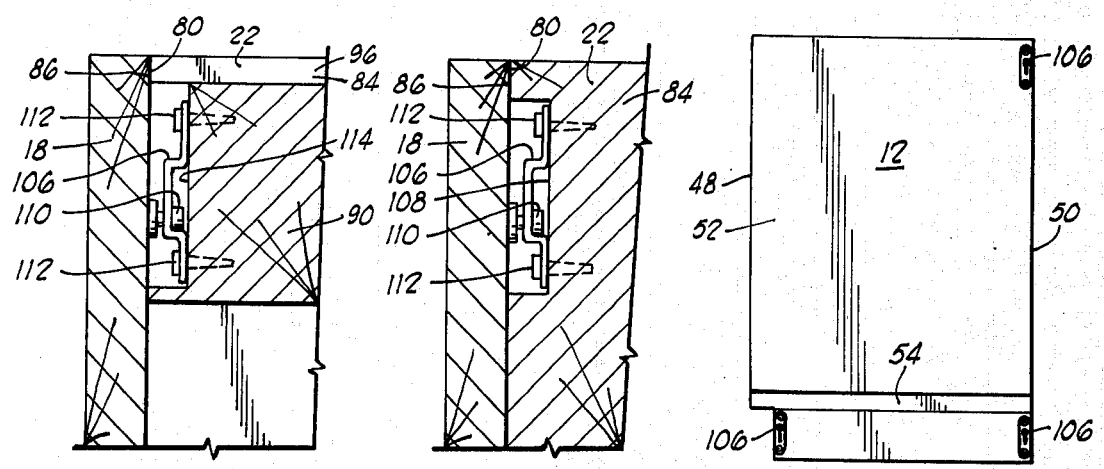
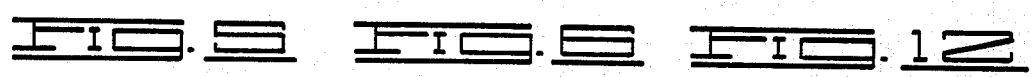

PREFABRICATED CABINET ASSEMBLY

BACKGROUND OF THE INVENTION

1. Field of the Invention

This invention relates generally to improvements in cabinet construction, and more particularly, but not by way of limitation, to an improved prefabricated cabinet assembly employing one or more intermediate bulkheads in its construction.

2. Description of the Prior Art

It is customary in the building trades to build cabinetry, such as residential cabinetry, at the building site by custom cutting and fitting the various cabinet structures to the available space. With the increased costs of skilled carpentry labor, it has become important in the construction industry to seek ways of minimizing the amount of time expended at the construction site in the construction of cabinetry.

In an effort to reduce the on site labor in the construction of cabinetry, prefabricated cabinet assemblies are now manufactured in which the various structural components thereof are constructed at the factory and shipped to the construction site in disassembled or knocked down condition. It has become customary for prefabricated cabinets, which employ one or more intermediate bulkheads in their construction, to rely on double panel construction at the intermediate bulkhead. Such construction increases the material required to construct a given cabinet assembly and further increases the shipping weight of the disassembled cabinet assembly.

The present invention discloses an improved intermediate bulkhead construction which eliminates the double panel construction of the prior art systems thus reducing, substantially, the material and transportation costs involved in the utilization of prefabricated cabinet assemblies which employ intermediate bulkheads in their structure.

SUMMARY OF THE INVENTION

The present invention contemplates an improved prefabricated cabinet assembly which includes a first end bulkhead and a second end bulkhead spaced from the first end bulkhead and lying in a plane parallel to the plane of the first end bulkhead. The assembly further includes a plurality of front panels lying in a common plane normal to the planes of the first and second end bulkheads and positioned in edge-to-edge relation between the first and second end bulkheads. The assembly provides means for rigidly connecting the first end bulkhead to one of the front panels adjacent thereto and means for rigidly connecting the second end bulkhead to another of the front panels adjacent thereto. The cabinet assembly further includes at least one intermediate bulkhead, each lying in a plane parallel to the planes of the first and second end bulkheads and engaging a corresponding one of the front panels proximate the edge thereof and adjacent the edge of the next adjacent front panel. The assembly provides means for rigidly connecting the at least one intermediate bulkhead and the corresponding one of the front panels and means for rigidly connecting the at least one intermediate bulkhead and the front panel next adjacent the front panel corresponding to the intermediate bulkhead, whereby the at least one intermediate bulkhead, the corresponding front panel and the front panel next adjacent thereto are rigidly mutually connected.

An object of the invention is to provide an improved prefabricated cabinet assembly which may be more efficiently erected at the construction site.

Another object of the invention is to provide an improved prefabricated cabinet assembly which is simple to erect.

Yet another object of the invention is to provide an improved prefabricated cabinet assembly comprising precut elements which can be shipped in a disassembled condition and can be quickly assembled at the installation site without special tools or skills.

A further object of the present invention is to provide an improved prefabricated cabinet assembly which employs efficient and simple means for interconnecting the various structural elements thereof.

A still further object of the invention is to provide an improved prefabricated cabinet assembly which provides economies in construction, transportation and erection.

Other objects and advantages of the invention will be evident from the following detailed description when read in conjunction with the accompanying drawings.

BRIEF DESCRIPTION OF THE DRAWINGS

FIG. 1 is a front elevation view of a prefabricated cabinet assembly constructed in accordance with the present invention.

FIG. 2 is a top plan view of the prefabricated cabinet assembly of FIG. 1.

FIG. 3 is a rear elevation view of the prefabricated cabinet assembly of FIG. 1.

FIG. 4 is a cross-sectional view taken along line 4—4 of FIG. 1.

FIG. 5 is an enlarged, fragmentary cross-sectional view taken along line 5—5 of FIG. 1.

FIG. 6 is an enlarged, fragmentary cross-sectional view taken along line 6—6 of FIG. 1.

FIG. 7 is an enlarged cross-sectional view taken along line 7—7 of FIG. 2.

FIG. 8 is an enlarged cross-sectional view taken along line 8—8 of FIG. 2.

FIG. 9 is an enlarged cross-sectional view taken along line 9—9 of FIG. 2.

FIG. 10 is an elevation view of one side of an intermediate bulkhead as viewed along line 10—10 of FIG. 1.

FIG. 11 is an elevation view of the opposite side of an intermediate bulkhead as viewed along line 11—11 of FIG. 1.

FIG. 12 is an elevation view of the inner surface of one end bulkhead as viewed along line 12—12 of FIG. 1.

DESCRIPTION OF A PREFERRED EMBODIMENT

Referring now to the drawings, and to FIGS. 1, 2 and 3 in particular, a preferred embodiment of the prefabricated cabinet assembly of the present invention is generally designated by the reference character 10. The cabinet assembly 10 includes a first end bulkhead 12, a second end bulkhead 14, a plurality of front panels 16, 18 and 20, a plurality of intermediate bulkheads 22, a plurality of horizontal bottom panels 24, 26 and 28, a plurality of front kick panels 30, 32 and 34, a plurality of upper back supports 36, 38 and 40 and a plurality of lower back supports 42, 44 and 46.

The first and second end bulkheads 12 and 14 are constructed of flat panels lying in vertical, parallel planes. The bulkheads 12 and 14 are of substantially identical construction, the bulkhead 14 being the opposite hand or mirror image of the bulkhead 12. As shown in FIG. 12, the first end bulkhead 12 includes a front vertical edge 48 and a rear vertical edge 50. The inner surface 52 of the bulkhead 12 includes a horizontal groove 54 formed therein in which a bottom panel may be received such as the bottom panel 24 as shown in FIG. 1. The outer surface 56 of the bulkhead 12 may be suitably finished such as with a wood veneer, a synthetic plastic veneer, or a paint or varnish finish.

It will be understood that the second end bulkhead 14 is of identical, but opposite hand construction, and the same reference characters applicable to the bulkhead 12 will be applied to the bulkhead 14. The outer surface 56 of the bulkhead 14 may be suitably finished as previously described for the bulkhead 12.

The front panels 16, 18 and 20 are disposed in a common vertical plane normal to the planes of the first and second end bulkheads 12 and 14. It will be understood that the front panels 16, 18 and 20 each include parallel vertical edges 58 and 60. It will also be understood that the width of each front panel between the parallel vertical edges 58 and 60 may vary from one another due to design considerations at the time of manufacture of the cabinet assembly 10. It will also be noted that the openings in each front panel may be varied from one panel to another depending on whether doors are to be installed on the panel or drawers mounted in the panel. The openings 62 and 64 in the front panels 16 and 18 are suitably configured for the installation of doors thereon. The openings 66, 68 and 70 in the front panel 20 are suitably configured for the installation of drawers therein. In a preferred embodiment, the outer surfaces 72, 74 and 76 of the front panels 16, 18 and 20 are preferably finished in a manner identical to that described above for the first and second end bulkheads. Also, the exposed vertical edge 58 of the front panel 16 and the exposed vertical edge 60 of the front panel 20 are also preferably so finished. The mutually abutting vertical edges of the front panels 16 and 18, and 18 and 20 are preferably unfinished. Similarly, the inner surfaces 78 80 and 82 of the front panels 16, 18 and 20 are preferably unfinished.

Each intermediate bulkhead 22 comprises a single vertical panel 84 having vertical front and rear edges 86 and 88. A plurality of rigid, substantially horizontal members 90, 92 and 94 are fixedly secured to the first vertical side 96 of the vertical panel 84 by suitable means such as threaded bolts 98 extending through the horizontal members and the second vertical side 100 of the vertical plane 84. A horizontal groove 102 is formed on the lower portion of the second vertical side 100 for slidingly receiving one edge of an adjacent bottom panel.

The horizontal members 90, 92 and 94 are substantially identical in construction and each includes a vertical edge 104, which vertical edges are coplanar with the adjacent vertical front edge 86 of the vertical panel 84.

It will be understood that the vertical panel 84 and the horizontal members 90, 92 and 94 of each intermediate bulkhead 22 are preferably unfinished since they are completely housed within the cabinet assembly 10 when assembled.

The various structural elements of the prefabricated cabinet assembly 10 are preferably mechanically interconnnected by means of clip assemblies each comprising a flexible slotted clip and a proturberant member or stud which is mutually engageable with the clip to fixedly secure adjacent structural members together. Such a suitable flexible clip and stud connecting apparatus is disclosed in U.S. Pat. No. 3,491,820 to Edward J. Ostling, which patent is incorporated herein by reference. FIGS. 5, 6, 7 and 8 illustrate in detail the employment of the slotted clip means and proturberant member means disclosed in the Ostling patent to provide mutual rigid connection between the first and second end bulkheads, intermediate bulkheads and the front panels of the cabinet assembly 10.

A slotted clip 106 is preferably installed in each of three recesses 108 formed in the front vertical edge 48 formed respectively in the first end bulkhead 12 and, similarly, in the front vertical edge 48 of the second end bulkhead 14. Corresponding proturberant members or studs 110 extend horizontally from the inner surfaces 78 and 82 of the front panels 16 and 20 where they are engaged by the corresponding slotted clips 106 to rigidly secure the first and second end bulkheads 12 and 14 to the front panels 16 and 20 adjacent the respective edges 58 and 60 thereof. It will be noted that each slotted clip 106 is secured to the associated structural element by means of a pair of screws 112.

In a similar manner, three slotted clips 106 are mounted in corresponding recesses 108 formed in the front edge 86 of the vertical panel 84 of each intermediate bulkhead 22, as shown in FIG. 7. The front edge 86 of each vertical panel 84 is secured to the inner surface of the corresponding front panel, along the vertical edge 60 thereof, by means of corresponding studs 110 extending horizontally therefrom and engaged with the corresponding slotted clips 106 in the intermediate bulkhead 22. This mutual interconnection is clearly illustrated in FIG. 6, and is typical of the interconnections between each intermediate bulkhead and the corresponding front panel as well as the interconnection between the first and second end bulkheads and their corresponding front panels.

Similarly, a slotted clip 106 is mounted in a recess 114 formed in the vertical edge 104 of each horizontal member of each intermediate bulkhead 22. Rigid interconnection between each intermediate bulkhead and the front panel next adjacent to the front panel corresponding to and fixedly secured to the front edge 86 of the vertical panel 84 is achieved by corresponding studs 110 extending horizontally from the inner surface of the next adjacent panel, adjacent the vertical edge 58 thereof, and mutually connected with the corresponding slotted clip 106 as shown in FIGS. 5 and 7. It will be noted that the recess 114 in each horizontal member 90, 92 and 94 is preferably open at the upper end thereof to facilitate assembly of the cabinet assembly 10.

Referring now to FIGS. 3, 4, 9, 10, 11 and 12, it will be seen that the upper and lower back supports 36 and 42 extend between the inner surface 52 of the first end bulkhead 12 and the second side 100 of an intermediate bulkhead 22. The upper and lower back supports 36 and 42 preferably include a horizontally outwardly extending stud 110 mounted in a recess formed in each end thereof for rigid interconnection with a corresponding slotted clip 106 mounted respectively on the inner surface 52 of the first end bulkhead 12 and on the second side 100 of the intermediate bulkhead 22. The slotted clips 106 referred to are illustrated adjacent the rear edge 88 of the vertical panel 84 in FIG. 11 and adjacent the rear vertical edge 50 of the first end bulkhead 12 in FIG. 12.

The upper and lower back supports 38 and 44 extend between, and are rigidly secured to the first vertical side 96 of the previously mentioned bulkhead 22 and the second vertical side 100 of another intermediate bulkhead 22. The recessed ends of the upper and lower back supports 38 and 44 are each provided with a slotted clip 106, as shown in FIG. 9, which is mutually secured to a corresponding stud 110 extending horizontally from the first vertical side 96 of the first mentioned intermediate bulkhead 22. The studs 110 are illustrated in FIG. 10 adjacent the rear vertical edge 88 of the vertical panel 84 illustrated therein. The opposite recessed ends of the upper and lower back supports 38 and 44 are each provided with a horizontally extending stud 110 which provides rigid connection between the back supports and the second intermediate bulkhead 22 through engagement with the two slotted clips 106 mounted thereon and shown in FIG. 11 adjacent the vertical rear edge 88 of vertical panel 84.

The upper and lower back supports 40 and 46 extend between the first vertical side 96 of the second intermediate bulkhead 22 and the inner surface 52 of the second end bulkhead 14. The construction of the upper and lower back supports 40 and 46 is substantially identical to the construction of the upper and lower back supports 38 and 44, as is the means of rigid interconnection achieved thereby between the second intermediate bulkhead 22 and the second end bulkhead 14.

Each of the lower back supports 42, 44 and 46 includes a horizontal groove 116 formed therein for receiving one edge of a corresponding bottom panel therein as typically shown in FIG. 9.

The kick panel 30 extends between the inner surface 52 of the first end bulkhead 12 and the second side 100 of an intermediate bulkhead 22. The kick panel 30 preferably includes a horizontally outwardly extending stud 110 mounted in a recess formed in each end thereof for rigid interconnection with a corresponding slotted clip 106 mounted respectively on the inner surface 52 of the first end bulkhead 12 and on the second side 100 of the intermediate bulkhead 22. The slotted clips 106 are illustrated adjacent a setback or offset portion at the lower end of the vertical edge 48 of the first end bulkhead 12 in FIG. 12, and adjacent the setback or offset portion at the lower end of the front edge 86 of the vertical panel 84 in FIG. 11.

The kick panel 32 extends between and is rigidly secured to the first vertical side 96 of the previously mentioned intermediate bulkhead 22 and the second vertical side 100 of another intermediate bulkhead 22. One recessed end of the kick panel 32 is provided with a slotted clip 106 which is mutually secured to a corresponding stud 110 extending horizontally from the first vertical side 96 of the first rigid intermediate bulkhead 22. The stud 110 is illustrated in FIGS. 7 and 10 adjacent the setback or offset portion below the front edge 86 of the vertical panel 84 illustrated therein. The opposite recess end of the kick panel 32 is provided with a horizontally extending stud 110 which provides rigid connection between the kick panel 32 and the second intermediate bulkhead 22 through engagement with the slotted clip 106 mounted thereon and shown in FIGS. 7 and 11 adjacent the setback or offset portion immediately below the front edge 86 of the respective vertical panel 84.

The kick panel 34 extends between the first vertical side 96 of the second intermediate bulkhead 22 and the inner surface 52 of the second end bulkhead 14. The construction of the panel 34 is substantially identical to the construction of the kick panel 32, as is the means of rigid interconnection achieved thereby with the second intermediate bulkhead 22 and the second end bulkhead 14.

The outer surfaces 118, 120 and 122 of the kick panels 30, 32 and 34 may be suitably finished in the manner similar to that described above for the first end bulkhead 12, while the remaining surfaces thereof preferably remain unfinished.

It will be understood that the prefabricated cabinet assembly 10 may include a horizontal top panel 124 suitably secured thereto as shown in FIGS. 1, 3 and 4. Depending on the particular application, the top panel 124 may be solid, may include a sink or lavatory structure therein, or may house conventional built-in cooking appliances such as electric or gas range units.

It should be understood that the structural nature of the previously described clips 106 and corresponding studs 110 may be reversed in the relative positions illustrated and described in the present invention. By carefully selecting the combinations of slotted clips 106 and studs 110, various components of the prefabricated cabinet assembly 10 can be partially assembled at the factory, through the installation of clips and studs thereon, to minimize or eliminate the possibility of incorrectly assembling the components at the construction site where the cabinet assembly is to be installed.

The prefabricated cabinet assembly 10 may be assembled on a smooth, level, solid assembly surface. A screwdriver, hammer and small block of wood are the tools necessary for the erection of the cabinet assembly 10.

To erect the prefabricated cabinet assembly 10, the first end bulkhead 12 is positioned in the vertical position on the assembly surface and one end of the kick panel 30 is secured thereto through the engagement of the stud 110 in one end of the kick panel and slotted clip 106 at the setback portion of the first end bulkhead 12. The opposite end of the kick panel 30 is engaged in a similar manner with the vertically oriented first intermediate bulkhead 22. The kick panel 30 is tapped into rigid interconnection with the bulkheads 12 and 22 by tapping downwardly thereon with the hammer acting through the small block of wood. In a similar manner, the kick panel 32 is tapped into engagement with the first intermediate bulkhead 22 and the vertically oriented second intermediate bulkhead 22. The second end bulkhead 14 is oriented vertically on the assembly surface and is engaged by the kick panel 34 in the manner described above for the kick panel 32. The opposite end of the kick panel 34 is engaged with the second intermediate bulkhead 22, and the kick panel 34 is tapped into locking engagement with the hammer acting through the small block of wood. It should be noted that the application of the tapping should be as near the lock joint as possible.

The lower back supports 42, 44 and 46 are then carefully positioned between the respective bulkheads and the clip lock assemblies, each comprising a slotted clip 106 and stud 110, are engaged and tapped into locking engagement with the hammer and block of wood. Next, the upper back supports 36, 38 and 40 are positioned between their respective bulkheads with the clip lock assemblies engaged and are tapped into locking engagement by means of the hammer and small block of wood.

With the end bulkheads and intermediate bulkheads secured in vertical parallel relation by the kick panels and the upper and lower back supports, as described above, the bottom panels 24, 26 and 28 are then slid horizontally into the respective horizontal grooves 54 and 102 of the bulkheads, and 116 of the lower back supports 42, 44 and 46.

The front panels 16, 18 and 20 are then mounted on the cabinet assembly 10 by positioning the studs 110 thereof in engagement with the corresponding slotted clips 106 thereof in engagement with the corresponding slotted clips 116 mounted on the front edges of the respective bulkheads to which each panel is to be secured. The front panels are locked to the bulkheads by tapping downwardly on the front panels with the hammer acting through the small block of wood adjacent the clip lock assemblies.

It will be understood that those front panels adapted for installation of doors will preferably include those doors (not shown) installed thereon at the time of delivery to the site. When such panels are locked to the remainder of the cabinet assembly 10, the doors attached thereto are completely installed and ready for operation. Prefabricated drawer structures (not shown) may then be installed in the openings 66, 68 and 70 to complete the erection of the cabinet assembly 10, with the exception of the installation of the top panel 124. The top panel 124 may be finally installed by running a head of bathtub sealer, or the like, around the top of the cabinet assembly and placing the top panel 124 thereon in proper final position.

Fine adjustments to the interconnection of the various clip assemblies throughout the structure of the cabinet assembly 10 may be made through the application of a screwdriver to the various studs 110 to provide a snug joint fit. It may also be advantageous during the erection of the cabinet assembly 10 to apply white glue to all joints before the engagement of the clip assemblies associated with the joint to provide additional strength to the cabinet assembly 10.

It will be seen that the novel structure of the cabinet assembly 10, and the particular novel structure of the intermediate bulkheads 22 provides great flexibility in the fabrication of such cabinet assembly employing one or more intermediate bulkheads in the construction thereof. The employment of a single vertical panel 84 in each intermediate bulkhead provides advantageous material economies over prefabricated cabinet assemblies which employ intermediate bulkheads constructed of two substantially identical vertical panels.

It will also be understood that the cabinet structure described above will be equally advantageous when employed in the construction of wall cabinets which aer intended to be mounted above the floor level. Such structure will be substantially identical to the above-described cabinet assembly except for the elimination of the necessity for kick panels and, in some cases, the necessity of a top panel. Further, it should be understood that additional horizontal panels may be included in the cabinet assembly of the invention to provide shelves which are spaced upwardly from the bottom panels in the cabinet assembly. Such horizontal panels will preferably be supported within the cabinet assembly in horizontal grooves in a manner identical to that described for the bottom panels.

Based on the foregoing it will be seen that the prefabricated cabinet assembly of the present invention provides distinct advantages in ease of construction, economy of manufacture, reduced shipping costs and flexibility of design. Changes may made in the combination and arrangement of parts or elements as heretofore set forth in the specification and shown in the drawings without departing from the spirit and scope of the invention as defined in the following claims.

What is claimed is:

1. An improved prefabricated cabinet assembly comprising:
    a first end bulkhead;
    a second end bulkhead spaced from said first end bulkhead and lying in a plane parallel to the plane of said first end bulkhead;
    a plurality of front panels lying in a common plane normal to the planes of said first and second end bulkheads and positioned in edge-to-edge relation between said first and second end bulkhead;
    means for rigidly connecting said first end bulkhead to one of said front panels adjacent thereto;
    means for rigidly connecting said second end bulkhead to another of said front panels adjacent thereto;
    at least one intermediate bulkhead, lying in a plane parallel to the planes of said first and second end bulkheads and engaging a corresponding one of said front panels proximate the edge thereof and adjacent the edge of the next adjacent front panel;
    means for rigidly connecting said intermediate bulkhead and said corresponding one of said front panels; and
    means for rigidly connecting said intermediate bulkhead and the front next adjacent the front panel corresponding to said intermediate bulkhead, whereby said intermediate bulkhead, the corresponding front panel and the front panel next adjacent thereto are rigidly mutually connected with said corresponding front panel and the front panel next adjacent thereto in edge-to-edge relation.

2. The improved prefabricated cabinet assembly as defined in claim 1 wherein:
    said means for rigidly connecting said intermediate bulkhead and said corresponding one of said front panels is characterized further to include:
        slotted clip means fixedly secured to said intermediate bulkhead adjacent said corresponding one of said front panels for slidingly receiving and retaining protuberant member means therein; and
        protuberant member means fixedly secured to and extending from said corresponding one of said front panels toward said slotted clip means for sliding interconnection with said slotted clip means in response to sliding movement of said corresponding one of said panels relative to said intermediate bulkhead.

3. The improved prefabricated cabinet assembly as defined in claim 2 wherein:
    said means for rigidly connecting said intermediate bulkhead and the front panel next adjacent the front panel corresponding to said intermediate bulkhead is characterized further to include:
        additional slotted clip means fixedly secured to said intermediate bulkhead adjacent said front panel next adjacent the front panel corresponding to said intermediate bulkhead, for slidingly receiving and retaining protuberant member means therein; and protuberant member means fixedly secured to and extending from said front panel next adjacent the front panel corresponding to said intermediate bulkhead toward said additional slotted clip means for sliding interconnection with said additional slotted clip means in response to sliding movement of said front panel next adjacent the front panel corresponding to said intermediate bulkhead relative to said intermediate bulkhead, whereby said intermediate bulkhead, the corresponding front panel, and the front panel next adjacent thereto are rigidly mutually connected.

4. The improved prefabricated cabinet assembly as defined in claim 3 wherein:

said means for rigidly connecting said first end bulkhead to one of said front panels is characterized further to include:

slotted clip means fixedly secured to said first end bulkhead adjacent said front panel for slidingly receiving and retaining protuberant member means therein; and protuberant member means fixedly secured to and extending from said front panel toward said slotted clip means for sliding interconnection with said slotted clip means in response to sliding movement of said front panel relative to said first end bulkhead.

5. The improved prefabricated cabinet assembly as defined in claim 4 wherein:

said means for rigidly connecting said second end bulkhead to another of said front panels is characterized further to include:

slotted clip means fixedly secured to said second end bulkhead adjacent said front panel for slidingly receiving and retaining protuberant member means therein; and protuberant member means fixedly secured to and extending from said front panel toward said slotted clip means for sliding interconnection with said slotted clip means in response to sliding movement of said front panel relative to said second end bulkhead.

6. An improved prefabricated cabinet assembly comprising:

a first end bulkhead lying in a vertical plane and having parallel vertical edges, an outer surface, and an inner surface;

a second end bulkhead spaced from said first end bulkhead and lying in a vertical plane parallel to the plane of said first end bulkhead, and having parallel vertical edges, an outer surface, and an inner surface facing the inner surface of said first end bulkhead;

a plurality of front panels, each having parallel vertical edges, an outer surface, and an inner surface, and lying in a common vertical plane normal to the planes of said first and second end bulkhead, each front panel being in edge-to-edge contact with the next adjacent front panel;

means for rigidly connecting one vertical edge of said first end bulkhead to the inner surface of the one of said front panels adjacent thereto proximate one vertical edge of said front panel;

means for rigidly connecting one vertical edge of said second end bulkhead to the inner surface of the one of said front panels adjacent thereto proximate one vertial edge of said front panel;

at least one intermediate bulkhead, each lying in a plane parallel to the planes of said first and second end bulkheads, and having parallel vertical edges, one vertical edge thereof engaging the inner surface of a corresponding one of said front panels proximate a vertical edge thereof and adjacent the vertical edge of the next adjacent front panel;

means for rigidly connecting the one vertical edge of each said intermediate bulkhead to the inner surface of the corresponding one of said front panels; and means for rigidly connecting each said intermediate bulkhead to the inner surface of the front panel next adjacent the front panel corresponding to said intermediate bulkhead, whereby said intermediate bulkhead, the front panel corresponding thereto and the next adjacent front panel are rigidly, mutually connected with said corresponding front panel and the front panel next adjacent thereto in edge-to-edge contact.

7. The prefabricated cabinet assembly as defined in claim 6, characterized further to include:

a plurality of rear support members lying in a common plane parallel to the plane of said front panels;

means for rigidly connecting said first end bulkhead to one of said rear support members adjacent thereto;

means for rigidly connecting said second end bulkhead to another of said rear support members adjacent thereto;

means for rigidly connecting each said intermediate bulkhead, proximate the opposite vertical edge thereof, to a corresponding one of said rear support members; and means for rigidly connecting each said intermediate bulkhead, proximate the opposite vertical edge thereof, to the rear support member next adjacent the corresponding one of said rear support members.

8. The prefabricated cabinet assembly as defined in claim 7 wherein each rear support member is related to a corresponding front panel.

9. The prefabricated cabinet assembly as defined in claim 8 wherein the horizontal spacing between the vertical edges of at least one front panel differs from the horizontal spacing between the vertical edges of one of the other front panels.

10. The prefabricated cabinet assembly as defined in claim 6 wherein:

said first and second end bulkheads each includes a finished outer surface and an unfinished inner surface; and said plurality of front panels are each characterized to include a finished outer surface and an unfinished inner surface.

11. The prefabricated cabinet assembly as defined in claim 10 wherein said intermediate bulkhead is characterized as being unfinished.

12. The prefabricated cabinet assembly as defined in claim 11 wherein said first and second end bulkheads, said plurality of front panels and said at least one intermediate bulkhead are formed of sheets of wood particle board.

13. An improved prefabricated cabinet assembly comprising:

a first end bulkhead lying in a vertical plane and having parallel vertical edges, an outer surface, and an inner surface;

a second end bulkhead spaced from said first end bulkhead and lying in a vertical plane parallel to the plane of said first end bulkhead, and having parallel vertical edges, an outer surface, and an inner surface facing the inner surface of said first end bulkhead;

a plurality of front panels, each having parallel vertical edges, an outer surface, and an inner surface, and lying in a common vertical plane normal to the planes of said first and second end bulkheads, each front panel being in edge-to-edge contact with the next adjacent front panel;

means for rigidly connecting one vertical edge of said first end bulkhead to the inner surface of the one of said front panels proximate thereto proximate one vertical edge of said front panel;

means for rigidly connecting one vertical edge of said second end bulkhead to the inner surface of the one of said front panels adjacent thereto proximate one vertical edge of said front panel;

at least one intermediate bulkhead, each lying in a plane parallel to the planes of said first and second end bulkheads, and having parallel vertical edges, one vertical edge thereof engaging the inner surface of a corresponding one of said front panels proximate a vertical edge thereof and adjacent the vertical edge of the next adjacent front panel, each said intermediate bulkhead further including:

a vertical bulkhead panel having parallel vertical front and rear edges, a first vertical side and a second, opposite vertical side; and at least one rigid horizontal member fixedly secured to the first side of said bulkhead panel, said horizontal member including a vertical edge thereon lying in a plane coinciding with the plane of the first vertical edge of said bulkhead panel;

means for rigidly connecting the one vertical edge of each said intermediate bulkhead to the inner surface of the corresponding one of said front panels, said means further including:

vertical slotted clip means fixedly secured to the front vertical edge of said vertical bulkhead panel for slidingly receiving and retaining protuberant member means therein; and horizontally extending protuberant member means fixedly secured to and extending inwardly from the inner surface of the corresponding one of said front panels for slidingly engaging said vertically slotted clip means and rigidly connecting the front vertical edge of said vertical bulkhead panel to the inner surface of the corresponding one of said front panels;

means for rigidly connecting each said intermediate bulkhead to the inner surface of the front panel next adjacent the front panel corresponding to said intermediate bulkhead, whereby said intermediate bulkhead, the front panel corresponding thereto and the next adjacent front panel are rigidly mutually connected with said corresponding front panel and the front panel next adjacent thereto in edge-to-edge contact, said means further including:

second vertically slotted clip means fixedly secured to the vertical edge of said at least one rigid horizontal member for slidingly receiving and retaining protuberant member means therein; and horizontally extending protuberant member means fixedly secured to and extending inwardly from the inner surface of the front panel next adjacent the front panel corresponding to said intermediate bulkhead for slidingly engaging said second vertically slotted clip means and rigidly connecting the vertical edge of said at least one rigid horizontal member to the inner surface of the front panel next adjacent the front panel corresponding to said intermediate bulkhead, whereby said intermediate bulkhead, the front panel corresponding thereto, and the next adjacent front panel are rigidly mutually connected with said corresponding front panel and the front panel next adjacent thereto in edge-to-edge contact.

* * * * *

UNITED STATES PATENT OFFICE
CERTIFICATE OF CORRECTION

Patent No. 3,993,377      Dated November 23, 1976

Inventor(s) John F. Montroy

It is certified that error appears in the above-identified patent and that said Letters Patent are hereby corrected as shown below:

Column 7, lines 13 and 14, delete "thereof in engagement with the corresponding slotted clips 116";

Column 7, line 31, change "head" to --bead--; and

Column 7, line 57, "aer" should be --are--.

Column 8, line 9, change "definied" to --defined--;

Column 8, line 20, "bulkhead" should be --bulkheads--; and

Column 8, line 35, after "front", first occurrence, and before "next", insert --panel--.

Column 9, line 60, "bulkhead" should be --bulkheads--.

Signed and Sealed this

Eighth Day of February 1977

[SEAL]

Attest:

RUTH C. MASON
Attesting Officer

C. MARSHALL DANN
Commissioner of Patents and Trademarks